(12) United States Patent
Dahl et al.

(10) Patent No.: US 7,220,209 B1
(45) Date of Patent: May 22, 2007

(54) MULTIMODAL VEHICLE TRACTION SYSTEM

(75) Inventors: Nathan Dahl, Salol, MN (US); Jeff Lovold, Roseau, MN (US); Tim Wysocki, Roseau, MN (US); Scott Ostroski, Roseau, MN (US); Dan Dewolfe, Roseau, MN (US); Sean Sherrod, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 11/263,127

(22) Filed: Oct. 31, 2005

Related U.S. Application Data (63) Continuation of application No. 10/783,985, filed on Feb. 19, 2004, now Pat. No. 6,976,553.

(51) Int. Cl.
*B60K 17/35* (2006.01)
(52) U.S. Cl. .................. 475/237; 180/247; 475/240
(58) Field of Classification Search ............. 475/231, 475/237, 238, 239, 240, 241; 180/233, 247, 180/248, 249, 250
See application file for complete search history.

(56) References Cited

U.S. PATENT DOCUMENTS

| | | | | |
|---|---|---|---|---|
| 2,234,890 A | 3/1941 | Brousseau | ............... | 74/316 |
| 2,803,150 A | 8/1957 | Fisher | ............... | 74/710.5 |
| 2,874,790 A | * 2/1959 | Hennessey | ............... | 180/6.2 |
| 3,732,752 A | 5/1973 | Louckes et al. | ............... | 74/710.5 |
| 4,347,760 A | 9/1982 | Jewett | ............... | 74/710.5 |
| 4,549,448 A | 10/1985 | Kittle | ............... | 74/710.5 |
| 4,570,509 A | 2/1986 | Nighswonger | ............... | 74/710.5 |
| 4,650,029 A | 3/1987 | Foote et al. | ............... | 180/248 |
| 4,706,770 A | 11/1987 | Simon | ............... | 180/24.02 |
| 4,775,026 A | 10/1988 | Sollbach et al. | ............... | 180/249 |
| 4,883,138 A | 11/1989 | Kameda et al. | ............... | 180/249 |
| 4,895,217 A | * 1/1990 | Hueckler et al. | ............... | 180/233 |
| 4,985,217 A | 1/1991 | Schmid | ............... | 423/235 |
| 5,004,064 A | 4/1991 | Tezuka et al. | ............... | 180/197 |
| 5,016,724 A | 5/1991 | Steinhagen et al. | ............... | 180/197 |
| 5,036,939 A | 8/1991 | Johnson et al. | ............... | 180/233 |
| 5,054,573 A | 10/1991 | Bennett | ............... | 180/244 |
| 5,103,690 A | 4/1992 | Macpherson et al. | ............... | 74/665 |
| 5,168,955 A | 12/1992 | Naito | ............... | 180/197 |
| 5,199,325 A | 4/1993 | Reuter et al. | ............... | 74/861 |
| 5,217,416 A | 6/1993 | Dick | ............... | 475/150 |
| 5,407,024 A | 4/1995 | Watson et al. | ............... | 180/248 |
| 5,570,755 A | 11/1996 | Fruhwirth et al. | ............... | 180/249 |
| 5,688,202 A | 11/1997 | Bowen | ............... | 475/199 |
| 5,752,211 A | 5/1998 | Takasaki et al. | ............... | 701/69 |
| 5,839,328 A | 11/1998 | Showalter | ............... | 74/650 |
| 5,899,951 A | 5/1999 | Babbel et al. | ............... | 701/67 |
| 6,083,134 A | 7/2000 | Godlew | ............... | 475/231 |
| 6,105,702 A | 8/2000 | Showalter | ............... | 180/247 |

(Continued)

*Primary Examiner*—Kevin Hurley
(74) *Attorney, Agent, or Firm*—Baker & Daniels LLP (57) ABSTRACT

This invention relates to multiple driven axle vehicles, and particularly to all-terrain vehicles equipped for rear wheel drive, four wheel drive, and on-demand front wheel drive. The invention is directed toward a system of switchable traction options allowing the vehicle operator to easily choose between different modes, such as rear wheel drive with an open or unlocked differential, rear wheel drive with a locked differential, four wheel drive with open differentials, four wheel drive with one locked differential, four wheel drive with two locked differentials, or rear wheel drive with on-demand four wheel drive.

16 Claims, 9 Drawing Sheets

U.S. PATENT DOCUMENTS

| | | |
|---|---|---|
| 6,161,643 A | 12/2000 | Bober et al. ................. 180/249 |
| 6,263,995 B1 | 7/2001 | Watson et al. ............... 180/248 |
| 6,309,321 B1 | 10/2001 | Valente ........................ 475/249 |
| 6,357,315 B1 | 3/2002 | Smith ........................... 74/473 |
| 6,360,156 B1 | 3/2002 | Morganroth et al. .......... 701/69 |
| 6,412,618 B1 | 7/2002 | Stretch et al. ................. 192/35 |
| 6,413,181 B2 | 7/2002 | Okada ........................... 475/83 |
| 6,449,549 B1 | 9/2002 | Dick ............................. 701/67 |
| 6,487,486 B1 | 11/2002 | Anderson ..................... 701/69 |
| 6,491,126 B1 | 12/2002 | Robison et al. .............. 180/233 |
| 6,533,090 B2 | 3/2003 | Osborn et al. ............. 192/48.2 |
| 7,070,019 B2 * | 7/2006 | Takamoto et al. .......... 180/403 |
| 2002/0070066 A1 | 6/2002 | Nakamura ................... 180/249 |
| 2002/0137589 A1 | 9/2002 | Banno et al. ................ 475/231 |
| 2002/0142877 A1 | 10/2002 | Williams et al. ............ 475/198 |
| 2002/0179357 A1 | 12/2002 | Gady et al. ................. 180/197 |
| 2003/0051937 A1 * | 3/2003 | Takamoto et al. .......... 180/417 |

\* cited by examiner

MULTIMODAL VEHICLE TRACTION SYSTEM

CROSS REFERENCE TO RELATED APPLICATIONS

This application is a continuation of prior application Ser. No. 10/783,985, filed on Feb. 19, 2004 now U.S. Pat. No. 6,976,553, for MULTIMODAL VEHICLE TRACTION SYSTEM.

FIELD OF THE INVENTION

This invention relates to multiple driven axle vehicles, and particularly to all-terrain vehicles equipped for front wheel drive.

BACKGROUND OF THE INVENTION

Vehicles, and particularly all-terrain vehicles (ATV's) are intended for use on a variety of different surfaces, including dry pavement, dirt, grass, slippery surfaces such as ice, and gravel. Typically, such vehicles are driven by their back wheels, but allowance is made for providing torque also to the front wheels when the back wheels slip, as, for example, when a vehicle becomes mired in mud.

ATVs, in addition to being driven on a wide variety of surfaces, are used in a wide variety of applications. In some of these applications, i.e., off-roading or search and rescue operations, traction is paramount. When used for golf course maintenance or residential projects for example, it may be more important that the vehicle do as little damage to the surface upon which it is ridden as possible. Further, performance characteristics of vehicles with differential gearing are superior for some applications, while for others fixed drive axle performance is preferred.

SUMMARY OF THE INVENTION

The invention relates to a motor vehicle having a multimode traction system. The vehicle is particularly adapted for use both off-road and on delicate terrain. The vehicle includes a pair of rear wheels, a pair of steerable front wheels, an engine for generating torque to drive the wheels, a rear differential operatively connected within a drive train and supplying engine torque to the rear wheels, a front wheel coupler connected within the drive train and receiving engine torque. The vehicle also includes a manually operable mode switch settable in first, second, and third positions that is located for easy operation by an operator of the vehicle while the vehicle is moving. The rear differential of the vehicle includes a lock for locking the differential in response to setting the switch into the first or second of the switch positions. The coupler of the vehicle enables torque received from the engine to be supplied to at least one front wheel to enable front wheel drive in response to setting the switch in the first position, and the coupler disenables engine torque from being supplied to the front wheels in response to setting the switch in the second or third positions.

In another embodiment, the invention relates to a motor vehicle having a multimode traction system particularly adapted for off-road use. The vehicle includes a pair of rear wheels, a pair of steerable front wheels, an engine for generating torque to drive the wheels, a rear differential operatively connected within a drive train and supplying engine torque to the rear wheels, a front wheel coupler connected within the drive train and receiving engine torque. The vehicle also includes a mode switch settable in turf mode and traction mode positions. The rear differential includes a lock for locking the differential when the mode switch is set in the traction mode position and for unlocking the differential when the mode switch is set in the turf mode position. The coupler enables torque received from the engine to be supplied to at least one front wheel to enable front wheel drive when the switch is set in the traction mode position, and the coupler disenables engine torque from being supplied to the front wheels when the switch is set in the turf mode position.

Another embodiment of the invention relates to a motor vehicle particularly adapted for off-road use that has a multimode traction system. The vehicle includes a pair of rear wheels, a pair of steerable front wheels, an engine for generating torque to drive the wheels, a rear differential operatively connected within a drive train and supplying engine torque to the rear wheels, a front wheel coupler means connected within the drive train and receiving engine torque. The vehicle also includes a mode switch means settable in turf mode and traction mode positions. The rear differential of the vehicle includes a lock for locking the differential when the mode switch means is set in the traction mode position and for unlocking the differential when the mode switch means is set in the turf mode position. The coupler means of the vehicle enables torque received from the engine to be supplied to at least one front wheel to enable front wheel drive when the switch means is set in the traction mode position, and the coupler means disenables engine torque from being supplied to the front wheels when the switch means is set in the turf mode position.

Another embodiment of the invention relates to a motor vehicle having a multimode traction system. The vehicle is particularly adapted for use both off-road and on delicate terrain. The vehicle includes a pair of rear wheels, a pair of steerable front wheels, an engine for generating torque to drive the wheels, a rear differential operatively connected within a rear drive train and supplying engine torque to the rear wheels, and a front differential operatively connected within a front drive train and supplying engine torque to the front wheels. The vehicle also includes a manually operable mode switch settable in first, second, and third positions and located for easy operation by an operator of the vehicle while the vehicle is moving. The rear differential includes a lock for locking the differential in response to setting the switch into the first or second of the switch positions. The front differential includes a lock for locking the differential in response to setting the switch into the first of the switch positions.

DETAILED DESCRIPTION

The invention relates to vehicles, and particularly to all-terrain vehicles, intended for use both off-road and on more delicate terrain, such as turf. The vehicle is preferably equipped for rear wheel drive and on-demand front wheel drive. The vehicle has a multimode traction system that allows the rider to select the desired traction mode based on the particular terrain or use of the vehicle. The rider may select between different traction modes, such as rear wheel drive with an open or unlocked rear differential, rear wheel drive with a locked rear differential, four wheel drive with unlocked rear and front differentials, four wheel drive with one or both of the front and rear differentials locked, or rear wheel drive with on-demand four wheel drive. Other traction modes are also contemplated within the scope of the invention. The rider may select the desired traction mode through the use of a convenient all-in-one switch. The ATV of the invention has the flexibility to be successful in difficult off-road environments and also be driven on delicate surfaces without damaging them.

As indicated above, the rear and optionally the front differential on the vehicle is lockable via the rider selector switch. When the differential is locked, the rotation of the wheels associated with that differential is fixed together. One possible configuration of a lockable rear differential comprises an activatable lock that selectively locks one driven half axle to the input shaft via the differential case. It is sufficient to lock only one axle because if that half axle cannot vary in speed relative to the input shaft, the opposite half axle connected to that differential is effectively locked by the inability of the differential to operate in the normal fashion. This embodiment is described in further detail below in reference to the Figures. It is understood, however, that the system may instead include locking differentials that lock both half axles to the input shaft.

The on-demand front wheel drive feature includes a coupler that transfers engine torque to the front wheels under certain conditions, such as when the coupler is activated via the rider selectable switch. In addition, the coupler may comprise an overrunning clutch system that transfers engine torque to the front wheels when the front wheel rotation speed differs from the rear wheel rotation speed by a predetermined amount. Alternatively, the coupler transfers engine torque to the front wheels when the coupler is activated, irrespective of the different speeds of the wheels.

The couplers and differential locks employed in the invention may be operated electrically, mechanically or hydraulically, but preferably are activated electronically and automatically. In one embodiment, an ATV is provided with a rider-operated selector switch enabling the rider to choose between on-demand four-wheel drive, two-wheel drive with a locked differential, and two-wheel drive with an open differential. Selection by the rider of two-wheel drive disables the couplers from becoming activated. Selection by the rider of two-wheel drive with an open differential disengages the differential lock. In another embodiment, an ATV is provided with a rider-operated selector switch enabling the rider to choose between four wheel drive with locked front and rear differentials, four wheel drive with one locked and one unlocked differential, and four wheel drive with two unlocked differentials.

Figure 1:
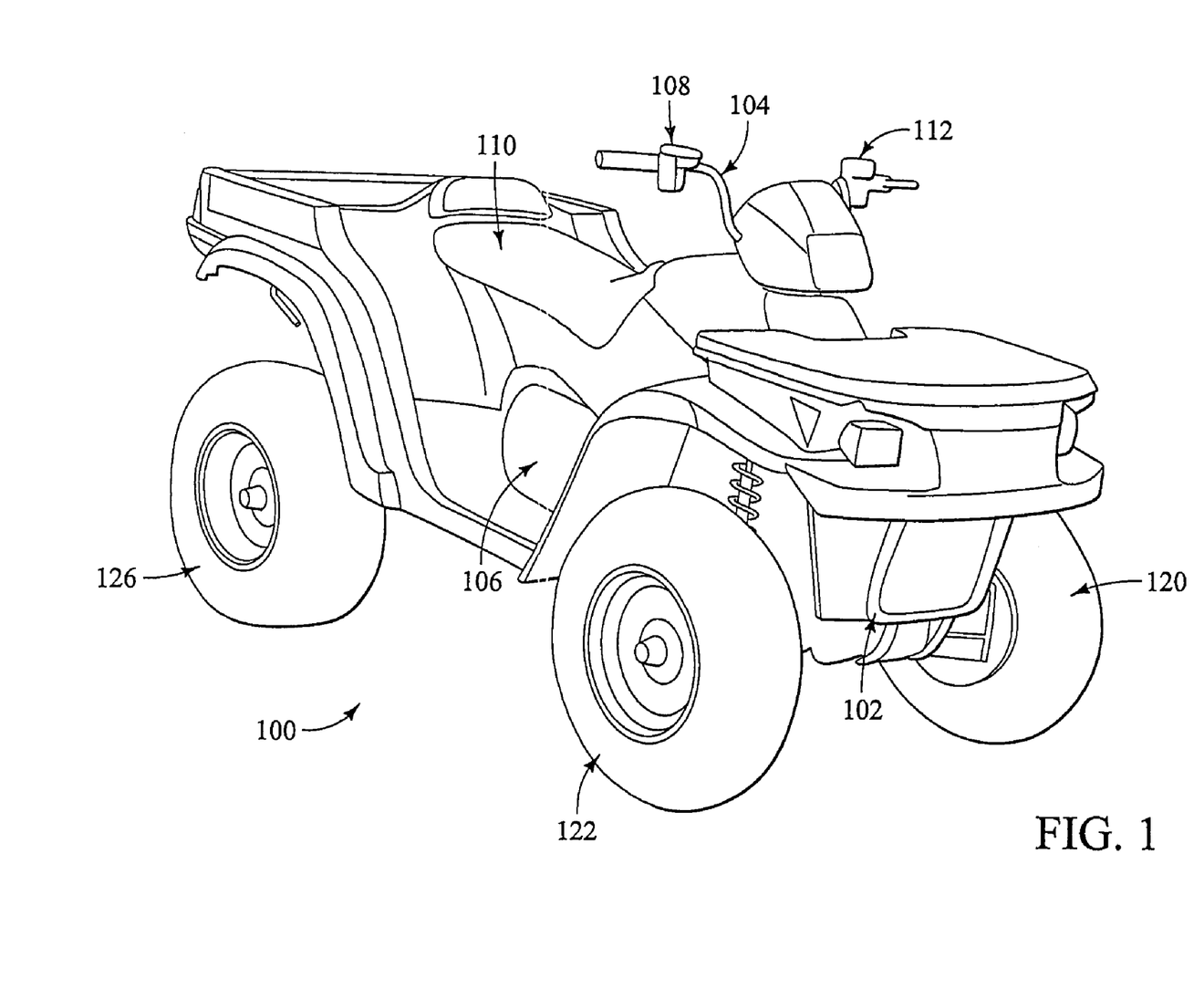
FIG. 1 is a perspective view of a vehicle in accordance with an exemplary embodiment of the present invention.

FIG. 1 is a perspective view of a vehicle 100 in accordance with an exemplary embodiment of the present invention. Vehicle 100 of FIG. 1 may be generally referred to as an ATV. Vehicle 100 comprises a frame 102 carrying a straddle type seat 110. In the embodiment of FIG. 1, straddle type seat 110 is sufficiently narrow to be straddled by a vehicle rider. In alternate embodiments, the seat may be of the bucket type, and a second seat for a passenger may be positioned on the side of or to the rear of the operator seat. In the embodiment of FIG. 1, vehicle 100 has a left front wheel 120, a right front wheel 122, a left rear wheel 124 and right rear wheel (not visible in FIG. 1). Vehicle 100 includes a handlebar 104 that may be used for steering vehicle 100.

In the embodiment of FIG. 1, left front wheel 120 and right front wheel 122 are each coupled to frame 102 by a front suspension and left rear wheel 124 is coupled to frame 102 by a rear suspension. Vehicle 100 also includes an engine 106 that is carried by frame 102. Engine 106 is preferably coupled to at least some wheels of vehicle 100 via a power train for propelling vehicle 100. Engine 106 may be used to power each rear wheel, and in some cases also each front wheel.

In some embodiments of the present invention, an input device of vehicle 100 may be used to provide a signal indicative of a desired drive mode. In some useful embodiments of the present invention, this input device may comprise a switch having three positions corresponding to three drive modes: an on-demand four-wheel drive mode, a two-wheel drive mode with a locked differential, and a two-wheel drive mode with an open or unlocked differential. In the embodiment of FIG. 1, vehicle 100 includes a multi-position mode switch 108 that is disposed on one arm of handlebar 104. The embodiment in FIG. 1 also shows an optional second switch 112 disposed on an arm of the handlebar 104.

Figure 2:
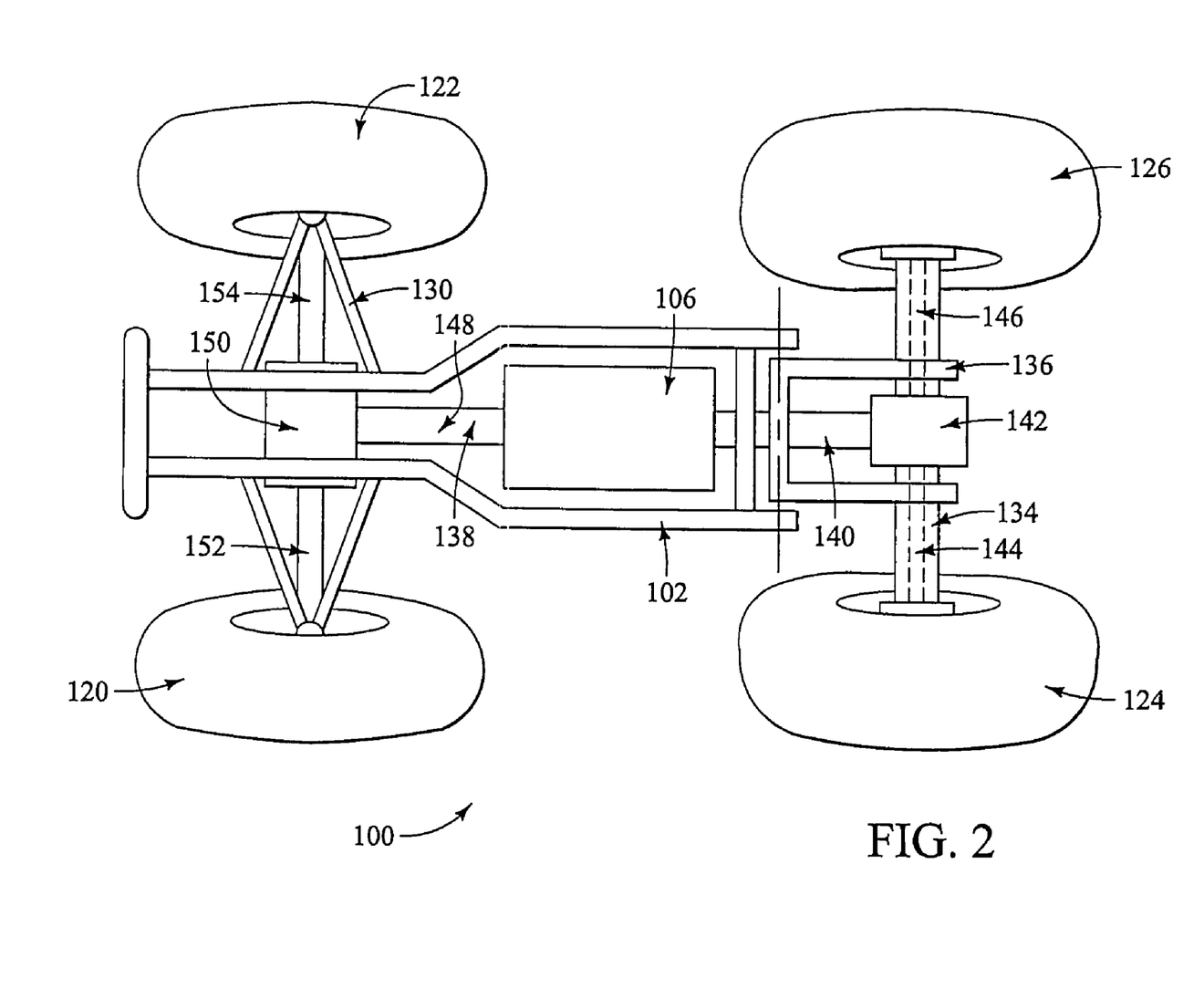
FIG. 2 is a bottom view of a vehicle 100 in accordance with an additional exemplary embodiment of the present invention.

FIG. 2 is a bottom view of a vehicle 100 in accordance with an additional exemplary embodiment of the present invention. Vehicle 100 of FIG. 2 may be generally referred to as an ATV. Vehicle 100 comprises a frame 102. A left front wheel 120, a right front wheel 122 are each coupled to frame 102 of vehicle 100 by a front suspension 130. Vehicle 100 also comprises a left rear wheel 124 and a right rear wheel 126.

In the embodiment of FIG. 2, left rear wheel 124 and right rear wheel 126 are both coupled to a rear axle assembly 134. Rear axle assembly 134 is coupled to frame 102 of vehicle 100 by a trailing arm 136. In the embodiment of FIG. 2, trailing arm 136 is free to rotate relative to frame 102.

Vehicle 100 includes an engine 106 that is supported by frame 102. In the embodiment of FIG. 2, engine 106 may be selectively coupled to various wheels of vehicle 100 via a power train 138 for propelling vehicle 100.

In the embodiment of FIG. 2, power train 138 includes a rear prop shaft 140 that delivers torque to a rear differential 142 that powers a left rear half axle 144 and a right rear half axle 146. Rear differential 142 may be a lockable differential. Lockable rear wheel differentials are shown, for example, in U.S. Pat. Nos. 4,995,853 and 3,732,752, the teachings of which are incorporated herein by reference. Also in the embodiment of FIG. 2, power train 138 includes a front prop shaft 148 that delivers torque to a front gearbox 150 that powers a left front half axle 152 and a right front half axle 154. Left front half axle 152 and right front half axle 154 are coupled to left front wheel 120 and a right front wheel 122, respectively. Left rear half axle 144 and right rear half axle 146 are coupled to left rear wheel 124 and a right rear wheel 126, respectively.

Figure 3:
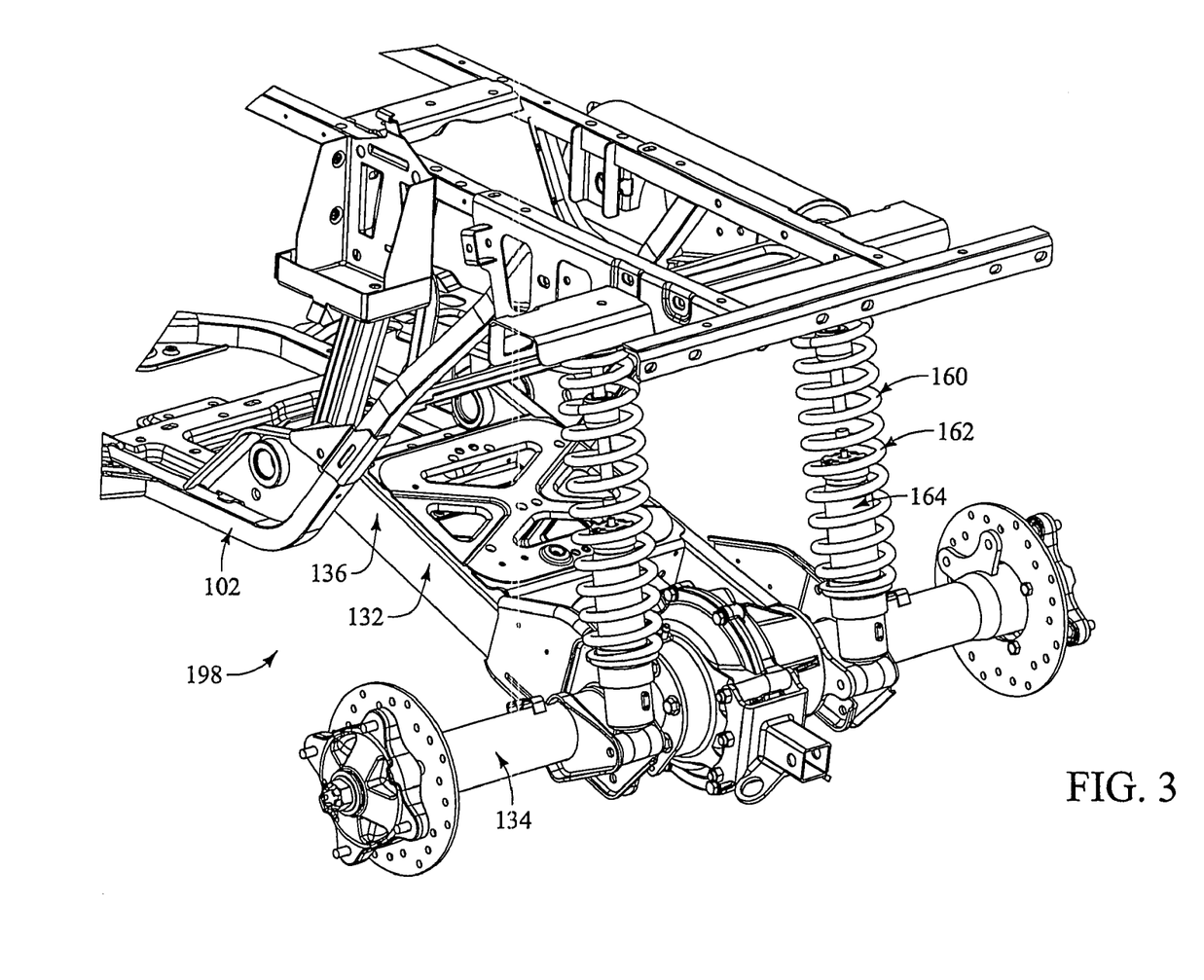
FIG. 3 is a perspective view of an assembly in accordance with an exemplary embodiment of the present invention.

FIG. 3 is a perspective view of an assembly 198 in accordance with an exemplary embodiment of the present invention. Assembly 198 of FIG. 3 comprises a rear axle assembly 134 and a frame 102 that may form part of a vehicle in accordance with the present invention. Rear axle assembly 134 includes a rear differential 142, a left hub 156 and right hub 158. With reference to FIG. 3, it will be appreciated that left hub 156 is fixed to a left rear half axle 144.

In the embodiment of FIG. 3, rear axle assembly 134 is coupled to frame 102 by a rear suspension 132. Rear suspension 132 of FIG. 3 may be generally referred to as a trailing arm suspension. Rear suspension 132 comprises a trailing arm 136 that is pivotally coupled to frame 102. In the embodiment of FIG. 3, rear suspension also includes a first spring assembly 160 and a second spring assembly 160. Each spring assembly 160 includes a spring 162 that is disposed about a shock absorber 164.

Figure 4:
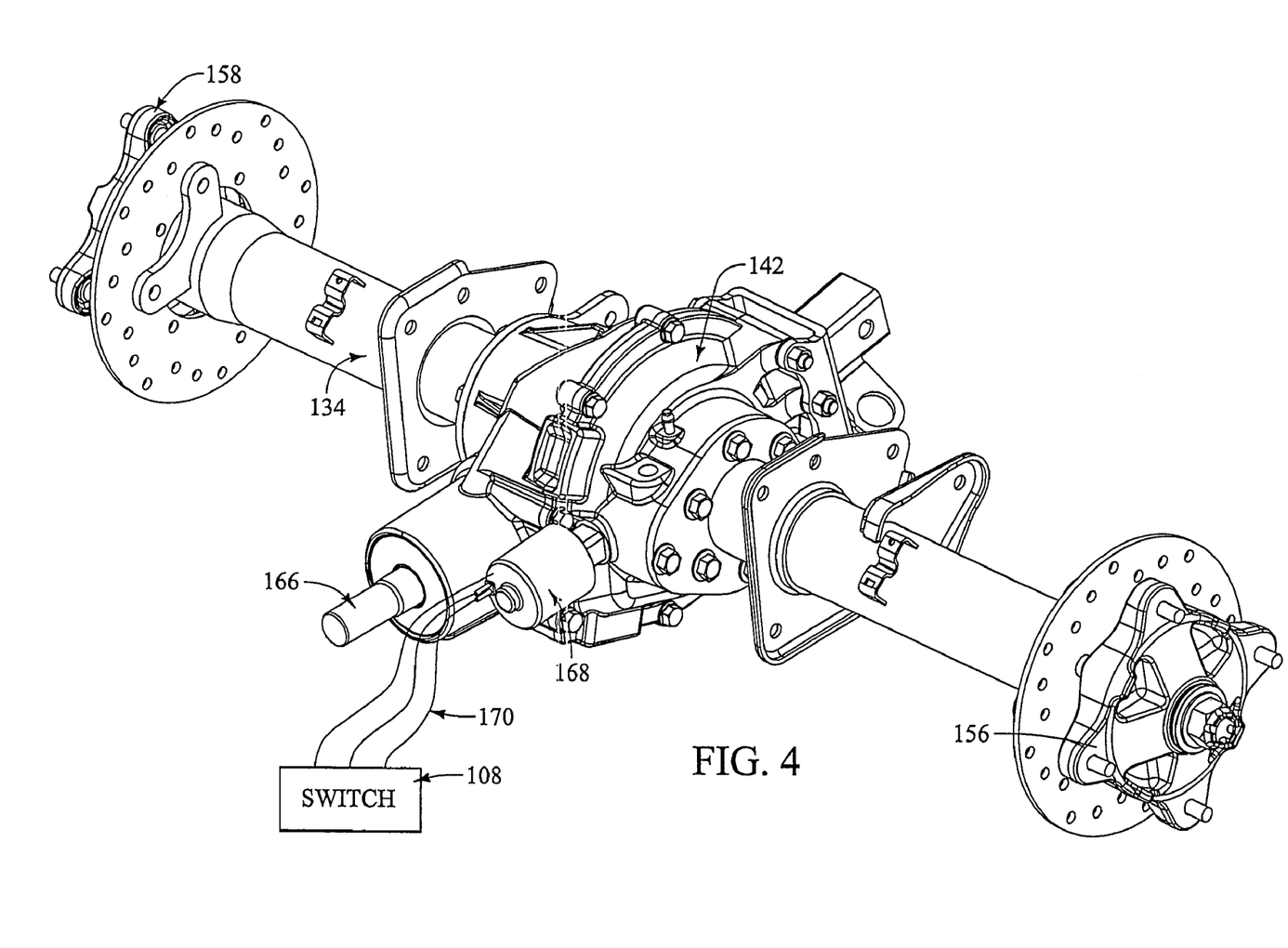
FIG. 4 is a perspective view of the assembly shown in FIG. 3.

FIG. 4 is a perspective view of rear axle assembly 134 shown in the previous figure. Rear axle assembly 134 includes a rear differential 142 having an input shaft 166. Rear differential 142 is preferably capable of selectively transferring rotational motion from input shaft 166 to a left hub 156 and a right hub 158 of rear axle assembly 134. With reference to FIG. 4, it will be appreciated that left hub 156 is fixed to a left rear half axle 144.

A solenoid 168 of rear axle assembly 134 is visible in FIG. 4. A switch 108 is illustrated with a box in FIG. 4. Switch 108 is electrically coupled to solenoid 168 by a plurality of wires 170. In some useful embodiments of the present invention, switch 108 has three positions corresponding to three drive modes: an on-demand four-wheel drive mode, a two-wheel drive mode with a locked differential, and a two-wheel drive mode with an open or unlocked differential.

Figure 5:
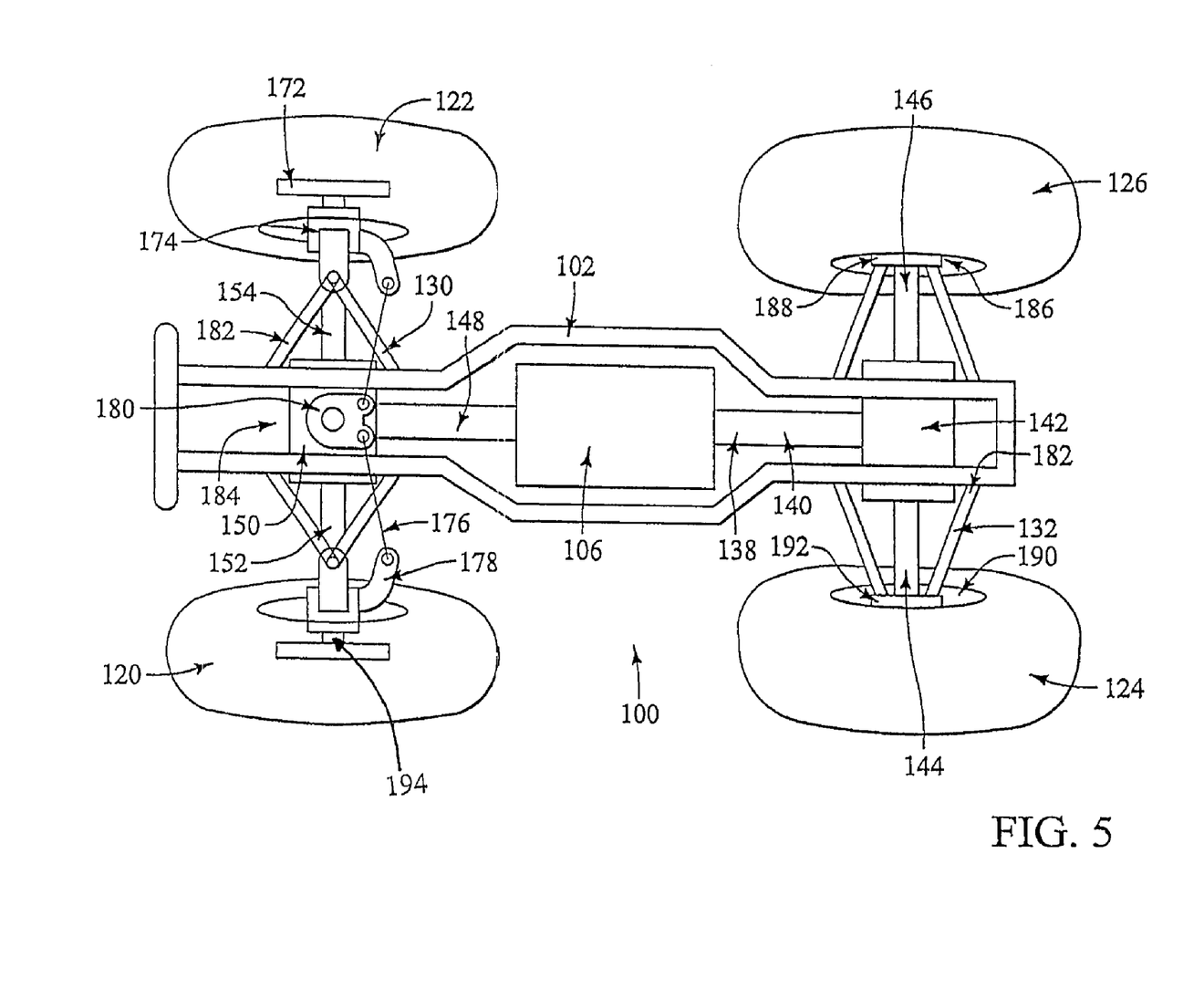
FIG. 5 is a bottom view of a vehicle in accordance with yet another exemplary embodiment of the present invention.

FIG. 5 is a bottom view of a vehicle 100 in accordance with yet another exemplary embodiment of the present invention. Vehicle 100 of FIG. 5 includes a left front wheel 120, a left rear wheel 124, a right front wheel 122, and a right rear wheel 126.

In FIG. 5, each front wheel is fixed to a hub 172 that is rotatably supported by a knuckle 174. In FIG. 5 it may also be appreciated that each knuckle 174 is coupled to a frame 102 of vehicle 100 by a front suspension 130. Also in the embodiment of FIG. 5, each front suspension 130 comprises a lower arm 182 that is rotatably coupled to frame 102.

Vehicle 100 also includes a front steering system 184. Front steering system 184 includes a left tie rod 176 and a right tie rod 176. In FIG. 5 it may be appreciated that left tie rod 176 is connected to a protrusion 178 of a left front knuckle 174 at an outer joint. In the embodiment of FIG. 5 left tie rod 176 is also connected to a bell crank 180 at an inner joint.

In FIG. 5 it may be appreciated that right tie rod 176 has a proximal end and a distal end. The distal end of right tie rod 176 is connected to a protrusion 178 of a right front knuckle 174 and the proximal end of right tie rod 176 is connected to bell crank 180.

In the embodiment of FIG. 5, left rear wheel 124 is rotatably supported by a left rear wheel carrier assembly 190 including a left rear wheel carrier 192. Right rear wheel 126 is rotatably supported by a right rear wheel carrier assembly 186 including a right rear wheel carrier 188. In some embodiments, each wheel carrier assembly comprises a hub that is rotatably supported by a wheel carrier.

In the embodiment of FIG. 5, left rear wheel 124 and right rear wheel 126 are coupled to a frame 102 of vehicle 100 by a left rear suspension 132 and a right rear suspension 132. With reference to FIG. 5, it will be appreciated that left rear suspension 132 of FIG. 5 includes a lower arm 182. In some cases, left rear suspension 132 may also include an upper arm that is not visible in FIG. 5. Right rear suspension 132 of FIG. 5 also includes a lower arm 182. In some cases, right rear suspension 132 may also include an upper arm that is not visible in FIG. 5. In the embodiment of FIG. 5, each lower arm 182 is rotatably coupled to frame 102 of vehicle 100 so as to rotate about a rotational axis.

Vehicle 100 includes an engine 106 that is supported by frame 102. In the embodiment of FIG. 5, engine 106 may be selectively coupled to various wheels of vehicle 100 via a power train 138 for propelling vehicle 100.

In the embodiment of FIG. 5, power train 138 includes a rear prop shaft 140 that delivers torque to a rear differential 142 that powers a left rear half axle 144 and a right rear half axle 146. Also in the embodiment of FIG. 5, power train 138 includes a front prop shaft 148 that delivers torque to a front gearbox 150 that powers a left front half axle 152 and a right front half axle 154. Left front half axle 152 and right front half axle 154 are coupled to left front wheel 120 and a right front wheel 122, respectively. Left rear half axle 144 and right rear half axle 146 are coupled to left rear wheel 124 and a right rear wheel 126, respectively.

Figure 6:
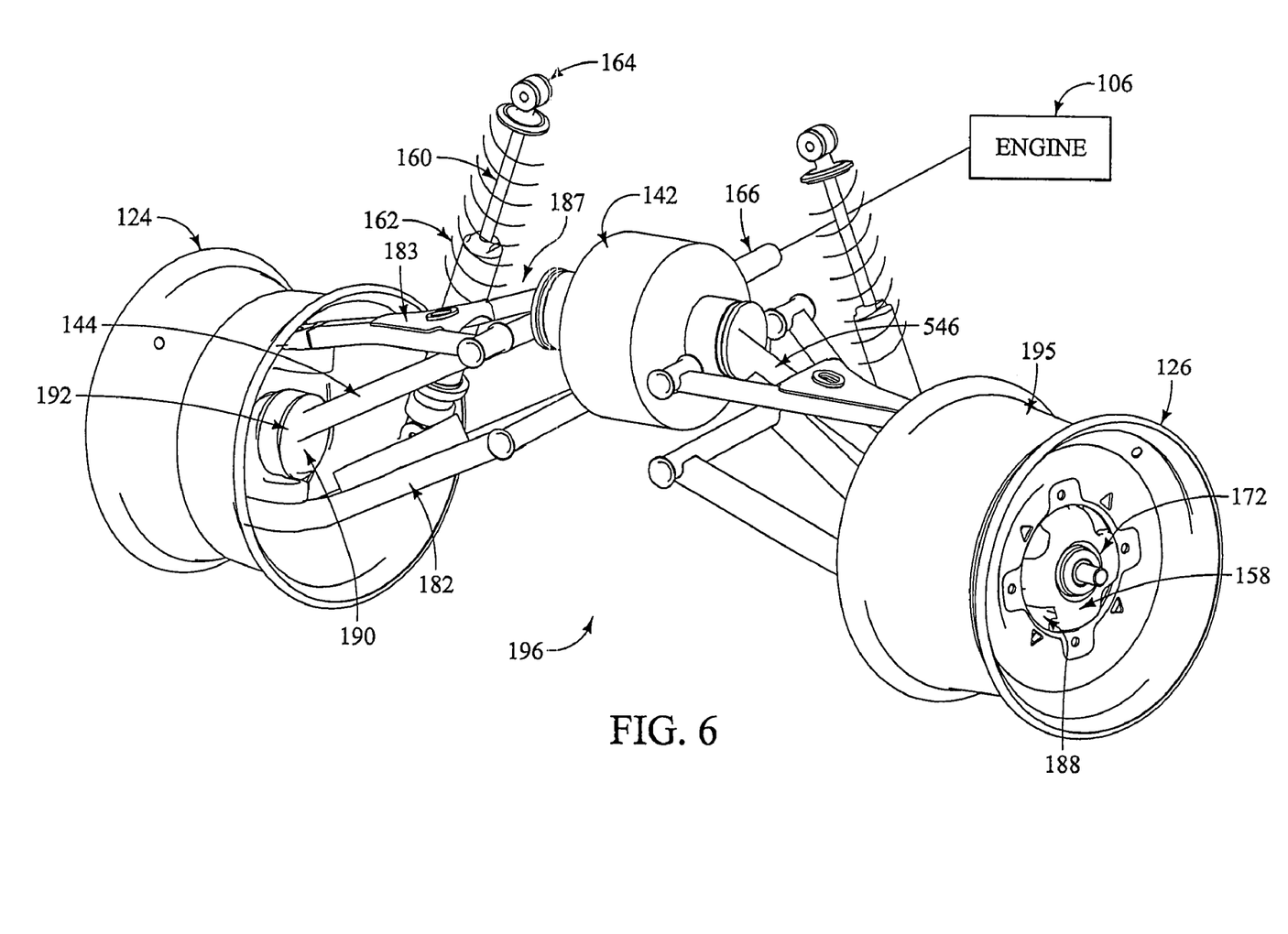
FIG. 6 is a perspective view of an assembly in accordance with an exemplary embodiment of the present invention.

FIG. 6 is a perspective view of an assembly 196 in accordance with an exemplary embodiment of the present invention. Assembly 196 includes a right rear wheel 126 and a left rear wheel 124. In the embodiment of FIG. 6, each wheel comprises a rim 195. It will be appreciated that each wheel may also include a tire that is not shown in FIG. 6.

Right rear wheel 126 of assembly 196 is supported by a right rear wheel carrier assembly 186 comprising a hub 172. Also in the embodiment of the FIG. 6, left rear wheel 124 is supported by a left rear wheel carrier assembly 190 comprising a left rear wheel carrier 192. In a preferred embodiment, each wheel carrier assembly comprises a hub that is rotatably supported by a wheel carrier. For example, a bearing may be disposed within a bore defined by the wheel carrier and a cylindrical portion of the hub may be received by an inner bore of the bearing.

Left rear wheel carrier assembly 190 may be coupled to a frame of a vehicle by a left suspension 187 including a left upper arm 183 and a left lower arm 182. In the exemplary embodiment of FIG. 6, a distal end of left upper arm 183 is coupled to an upper portion of left rear wheel carrier assembly 190. Also in the exemplary embodiment of FIG. 6, a distal end of lower arm 182 is coupled to a lower portion of left rear wheel carrier assembly 190.

Left suspension 187 also includes a left spring assembly 160 having a first end rotatably coupled to left lower arm 182. A second end of left spring assembly 160 may be rotatably coupled to a vehicle frame. In the embodiment of FIG. 6, each spring assembly includes a shock absorber 164 and a spring 162 that is disposed about shock absorber 164.

In FIG. 6, a distal portion of a right rear half axle 146 can be seen extending beyond right hub 158. In the embodiment of FIG. 6, right rear half axle 146 is preferably connected to right hub 158 so as to drive right rear wheel 126. A left rear half axle 144 is also shown in FIG. 6. Proximal ends of left rear half axle 144 and right rear half axle 146 may be connected to a drive train of a vehicle.

An engine 106 is illustrated using a box in FIG. 6. In the embodiment of FIG. 6, engine 106 is coupled to an input shaft 166 of a rear differential 142. Engine 106 and rear differential 142 may cooperate to selectively rotate a left rear half axle 144 and a right rear half axle 146. Left rear half axle 144 and right rear half axle 146 are coupled to left rear wheel 124 and a right rear wheel 126, respectively.

Figure 7:
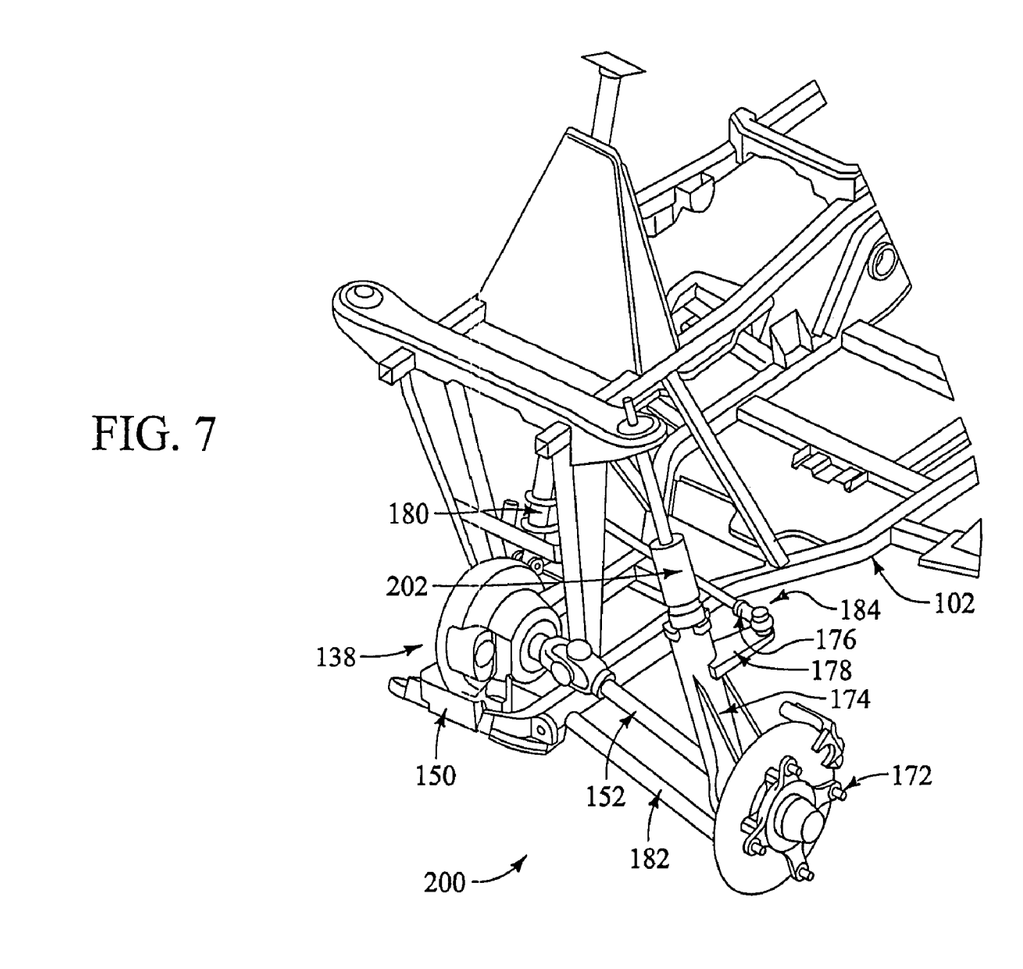
FIG. 7 is a perspective of an assembly in accordance with an exemplary embodiment of the present invention.

FIG. 7 is a perspective of an assembly 200 in accordance with an exemplary embodiment of the present invention. Assembly 200 comprises one side of the front drive and suspension assembly of a vehicle of the invention. Assembly 200 includes a left hub 172, it being understood that a wheel and tire can be attached to the hub. In FIG. 7, the hub 172 is rotatably supported by a knuckle 174. The knuckle 174 is coupled to a frame 102 by a front suspension 130. Also in the embodiment of the assembly of FIG. 7, each front suspension 130 comprises a lower arm 182 that is rotatably coupled to frame 102. Each front suspension further includes a strut 202 which extends from the frame 102 to the knuckle 174. The strut may have a spring disposed about it.

Assembly 200 also includes a front steering system 184. Front steering system 184 includes a left tie rod 176 and a right tie rod 176. In FIG. 7 it may be appreciated that left tie rod 176 is connected to a protrusion 178 of a left front knuckle 174 at an outer joint. In the embodiment of FIG. 7 left tie rod 176 is also connected to a bell crank 180 at an inner joint.

Also in the embodiment of FIG. 7, power train 138 includes a front prop shaft 148 (shown in FIG. 5) that delivers torque to a front gearbox 150 that powers a left front half axle 152 and a right front half axle (not shown). Left front half axle 152 and right front half axle are coupled to left front wheel hub 172 and a right front hub, respectively.

Couplers may be, in one embodiment, located at the front wheel hubs and serve to transmit torque from the front half axles 152, 154 to the respective hubs. Torque from the engine 106 is delivered forwardly through drive shaft 148 and is distributed to the front axle halves by the front gear box 150. Prop shaft 140 delivers torque rearwardly to the rear lockable differential 142, which then supplies torque to the rear half axles 144, 146 and then to the rear wheels 124, 126.

Figure 8:
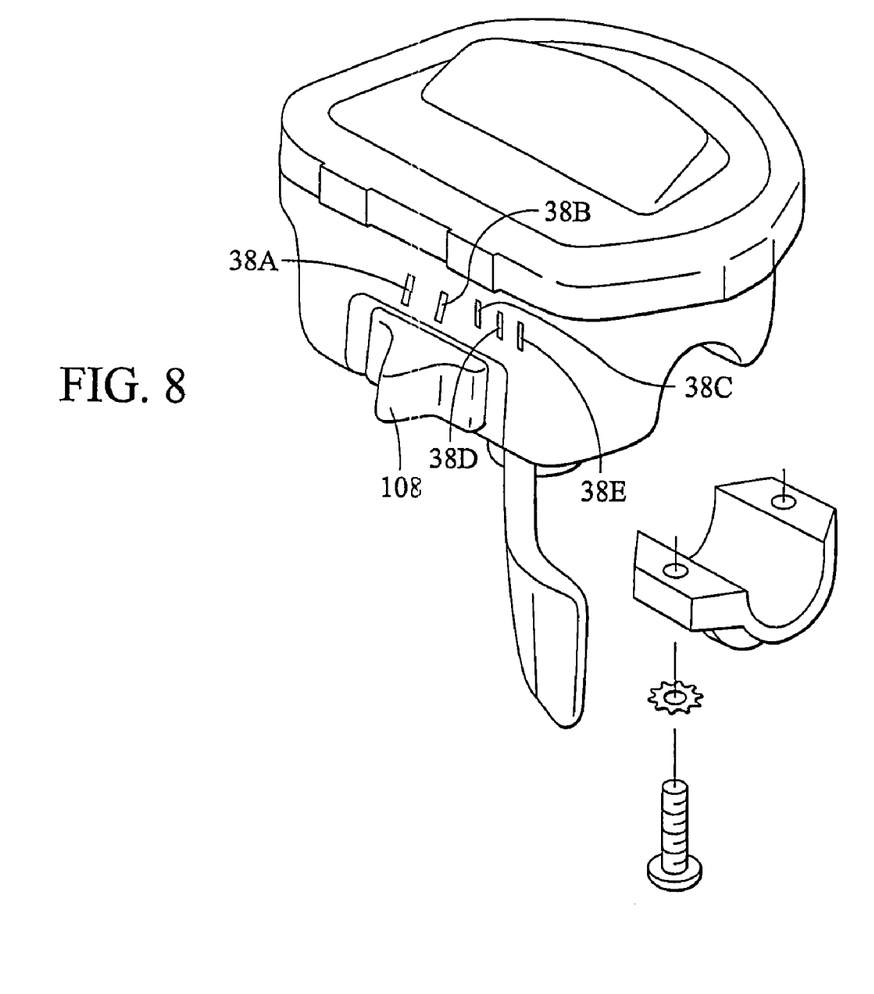
FIG. 8 is a perspective view of a switch in accordance with an exemplary embodiment of the present invention.

Referring now to FIG. 8, in one embodiment, a multi-position mode switch 108 is used to select the vehicle operation mode. Preferably, the mode switch 108 is located in a position convenient to the operator. Typically, the switch 108 is mounted on the right handlebar, nearby the throttle lever, as shown in FIG. 1. Switch 108 controls the electrical signal to both the lockable differential 142 and the coupler actuator. The switch positions, 38A, 38B, and 38C may refer to three different operation modes: on-demand four-wheel drive (providing greater traction), two-wheel drive with a locked differential (providing good traction), and two-wheel drive with an open or unlocked differential (turf mode). When the switch is in the first position 38A, the lockable differential 142 is locked.

In another embodiment, the vehicle includes a lockable front differential within the front gearbox 150. The front lockable differential may include the same essential elements as the rear lockable differential and operates in substantially the same fashion. In this embodiment, three switch positions, 38A, 38B, and 38C may refer to three different operation modes: four wheel drive with open front and rear differentials, four wheel drive with one open and the other locked differential (preferably the rear locked and the front unlocked), and four wheel drive with two locked differentials.

In another embodiment, the vehicle includes a front lockable differential within the front gearbox 150 and a coupler between the engine 106 and the front gearbox 150. The coupler when activated may enable or disenable torque received from the engine to be supplied to the front differential. In this embodiment, four switch positions, 38A, 38B, 38C, and 38D may refer to four different operation modes: two wheel drive with an open rear differential, four wheel drive with two open differentials, four wheel drive with one locked and one open differential (preferably the rear locked and the front unlocked), and four wheel drive with two locked differentials.

In another embodiment, the vehicle includes a front lockable differential within the front gearbox 150 and a coupler between the engine 106 and the front gearbox 150. The coupler when activated may enable or disenable torque received from the engine to be supplied to the front differential. In this embodiment, five switch positions, 38A, 38B, 38C, 38D, and 38 E may refer to five different operation modes: two wheel drive with an open rear differential, two wheel drive with a locked differential, four wheel drive with two open differentials, four wheel drive with one locked and one open differential (preferably the rear locked and the front unlocked), and four wheel drive with two locked differentials.

In another embodiment, the vehicle includes a front lockable differential within the front gearbox 150 and a coupler between the engine 106 and the front gearbox 150. The coupler when activated may enable or disenable torque received from the engine to be supplied to the front differential. The vehicle further includes a second switch 112 which may be configured similarly to mode switch 108. In this embodiment, mode switch 108 may have three switch positions, 38A, 38B, and 38C and second switch 112 may have two switch positions, 38D, and 38E. In this embodiment, second switch 112 controls the coupler and mode switch 108 controls the differentials. When second switch 112 is in position 38D, the coupler may disenable torque received from the engine to be supplied to the front differential. In this condition, the first of the three switch positions of switch 108, 38A, 38B, and 38C, may refer to two-wheel drive with an open rear differential, and the other two positions refer to two-wheel drive with a locked rear differential. When second switch 112 is in position 38E, the coupler may enable torque received from the engine to be supplied to the front differential. In this condition, the three switch positions, 38A, 38B, and 38C of mode switch 108 may refer to three different operation modes: four wheel drive with open front and rear differentials, four wheel drive with one open and the other locked differential (preferably the rear locked and the front unlocked), and four wheel drive with two locked differentials. Thus in combination mode switch 108 and second switch 112 may refer to five different operation modes: two wheel drive with an open rear differential, two wheel drive with a locked differential, four wheel drive with two open differentials, four wheel drive with one locked and one open differential (preferably the rear locked and the front unlocked), and four wheel drive with two locked differentials.

Figure 9:
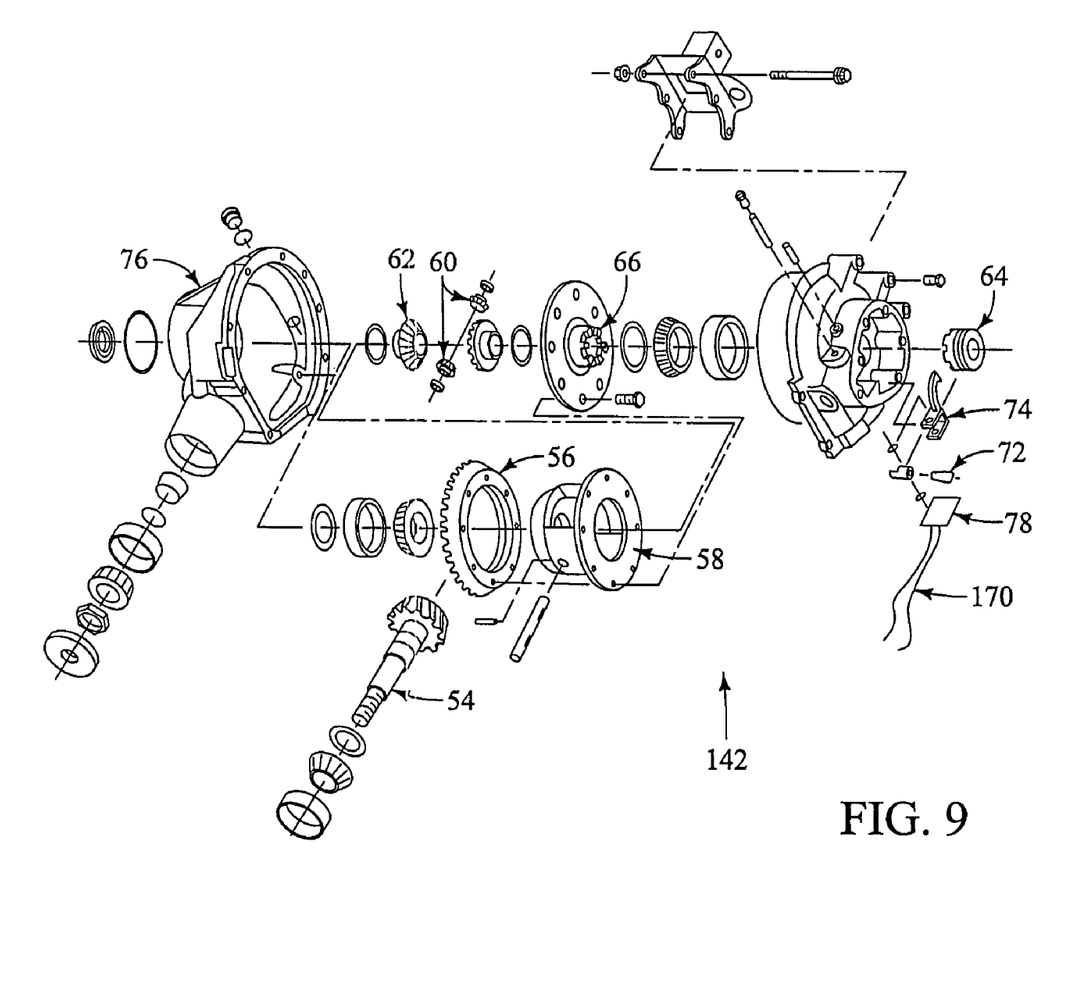
FIG. 9 is an exploded perspective view of a lockable differential in accordance with an exemplary embodiment of the present invention.

One possible configuration of the lockable rear differential is shown in exploded view in FIG. 9. An input shaft 54 with a pinion engages a ring gear 56. The ring gear 56 rotates with a differential case 58 to which are attached differential pinions 60. The differential pinions 60 engage the side gears 62 to drive the rear axles 144, 146 (shown in FIG. 2). When the differential is not locked, the differential pinions 60 rotate to allow the rear axles 144, 146 to be driven at different speeds, as when the vehicle is cornering. While this is advantageous to improve handling and prevent tire scrub and surface damage when traction is not an issue, if one wheel has poor traction it will spin ineffectively while little torque is applied to the other wheel which may have better traction. Thus, with the switch 108 in position 38A, an axle gear clutch 64 engages with a case clutch 66 present in this embodiment to lock one of the rear axles 22 to the differential case 58. Once one of the rear axles 144 cannot move relative to the differential case 58, the other is also locked by the effect of the differential pinions 60, which no longer rotate. The front lockable differential may contain the same essential components and operate in essentially the same fashion as the rear lockable differential.

The default setting for the lockable rear differential is locked as described above. That is, the lockable rear differential 142 is preferably locked when no electrical signal is communicated to it. In this configuration, if the control system should fail, the differential is biased in the locked position and provides adequate traction to allow the operator to escape from poor traction conditions and drive the ATV to a repair opportunity. In addition, the differential will shift to or remain in the locked position when the vehicle is turned off. This setting helps secure the vehicle in a parked position when the vehicle is off.

In one embodiment, with the switch in position 38A, the coupler actuator is in the on position. Once the coupler has been activated, it will couple the front prop shaft to front half axles 152, 154 if and only if the rotational speed of the axle and the prop shaft are proportionally equal. That is, either or both half axles 152, 154 may be coupled to the front prop shaft depending on the rotational speed of the respective half axle. It will also be understood that although the couplers for each wheel are activated simultaneously by the switch 108 the couplers may act independently of each other, depending on relative speed differences. Examples of appropriate couplers are a centralized Hilliard clutch (Part # 1341344) and a bearingless centralized Hilliard clutch (Part # 1341497) manufactured by Hilliard Corporation of New York. This coupler may work in the same fashion as the overrunning clutches described below, that is, utilizing a roller cage and a plurality of rotatable roller members in conjunction with a coaxially oriented race and cam configuration. By using one centralized coupler in the front gearbox 150, the function of some of the parts may be combined for a simpler and more economical construction.

In this embodiment the rotational speed of the prop shaft 148 will likely differ from the rotational speed of the axles due to a gear reduction that often takes place in the front gearbox 150. Therefore it may not be the front prop shaft rotational speed that is compared to the axle rotational speed. Rather the rotational speed of the driving portion of the coupler is compared to the rotational speed of the driven portion of the coupler at the coupler itself, wherever located. In this context, the driving portion of the coupler or drive train is the portion to which torque is supplied by the engine whether or not the coupler is engaged, and the driven portion of the coupler or drive train is that portion to which torque is only supplied when the coupler is engaged.

While the vehicle is traveling in good traction conditions without the coupler being engaged, the driven portion of the drive train is rotating due to torque provided by the front tires as they are propelled across the ground by the rear tires. The coupler may be designed to couple the driving portion to the driven portion only when actuated and when the driving portion is turning at least as fast as the driven portion. In this embodiment, the drive train may advantageously be designed such that the driven portion under these good traction conditions is rotating faster than the driving portion. This provides, among other advantages, a reduced likelihood that the coupler will couple the drive train unnecessarily when one front tire is slowed while turning, for example. Even still, with this design if traction for the rear wheels decreases, the driving portion will rotate faster relative to the passive driven portion. If the coupler is actuated, the coupler will couple the driving portion to the driven portion and the engine will provide torque to the front wheels. Torque will continue to be provided until the driven portion again is rotating faster than the driving portion.

Although the invention has thus far been described primarily in connection with a central coupler that connects the front prop shaft to either or both front half axles 152, 154, it should be understood that the couplers may be placed elsewhere in the second drive train leading from the engine to the front wheels. For instance, a pair of couplers could be placed between the front gearbox 150 and each of the half axles 152, 154. This would function in essentially the same fashion as the embodiment just described, and either or both wheels could be coupled to the drive train depending on the conditions.

In another embodiment only a single coupler is employed between the engine 106 and the front prop shaft 148. A single coupler could also be employed between the prop shaft 148 and the front gearbox 150. In either of these cases the front wheels would both be coupled to the engine 106 at the same time.

In another embodiment, right and left couplers may be placed between each front half axle and wheel hub. In this embodiment, when the couplers are activated, each coupler will couple its respective front half axle to a wheel hub if and only if the rotational speed of the axle and the rotational speed of the hub differ by a predetermined amount. As to a design for on-demand front wheel drive and to the design of couplers formed from overrunning roller clutch hubs, reference is made to U.S. Pat. No. 5,036,939, the teachings of which are incorporated herein by reference. The overrunning clutches in this embodiment typically include a roller cage and a plurality of rotatable roller members, as described in commonly owned U.S. Pat. No. 5,036,939. The roller cage spaces the rollers circumferentially from one another and limits circumferential movement of the rollers with respect to the cage. The generally cylindrical cam is driven by the transmission. It has an outer surface for engaging the rollers. A race is provided coaxial of the cam and has a generally cylindrical inner surface. The rollers and the roller cage are interposed between the cam surface and the race surface, and the rollers are spring-urged radially inwardly with respect to the cam axis. The cam surface is configured so that as the roller cage and rollers rotate in a given direction with respect to the cam, the rollers are urged radially outwardly to engage the cam and race whenever the driving member attempts to rotate faster than the driven member.

Further, while the description has focused on overrunning roller clutch hubs to engage the front wheels only when a rotational speed difference is sensed, embodiments of the invention include couplers which, when activated, couple the front axles to the wheel hubs, or other elements of the drive train to each other as just described, simply upon being activated and irrespective of rotational speed differences between the driving and driven members. That is, in this alternate embodiment, the on-demand front wheel drive is engaged immediately upon activation of the coupler mechanism.

Referring back to the FIG. 8, the three-position switch 108 also has a second position 38B, shown centrally on the switch. Position 38B corresponds to two-wheel drive mode with a locked differential. In position 38B, the coupler actuators are in the off position and the coupler will not engage and transfer torque from the engine to the front axles 152, 154. In this second position the lockable rear differential 142 remains locked so that both rear wheels are driven at the same speed. ATVs have historically had solid rear axles without differentials and many ATV riders prefer performance characteristics of a solid axle or locked differential, particularly in off-road environments where the wheels lose traction fairly easily.

Finally, mode switch 108 also has a third position 38C, shown on the right side of the switch in FIG. 8. Position 38C corresponds to "turf mode" or rear wheel drive mode with an unlocked differential. The front wheels spin freely in this mode. In position 38C, couplers are deactivated (similar to position 38B) and the rear lockable differential 142 is unlocked. That is, switch 108 sends a signal to differential 142 to changed it from its default locked position to an unlocked position. ATVs that turn both rear wheels equally (e.g., no differential or a locked differential) have a relatively wider turning radius and can damage grass and other soft terrain when turning. When the differential is unlocked in this manner, the ATV may be turned sharply without the inside rear tire scrubbing or churning up the ground since each rear tire may spin at different speeds. This helps minimize damage to turf and other sensitive areas. This third position allows the ATV to be driven on, for example, golf courses or residential property that an older fixed axle ATV may have damaged. When unlocking the rear differential in turf mode, the turning radius on the vehicle is approximately 20% tighter. The tighter turning radius makes it easier to steer and maneuver when working, hunting or trail riding.

In the exemplary embodiment shown in FIG. 9, the lockable differential 142 may be unlocked by electrically activating a solenoid 78 that engages the clutch lever 72 to move the clutch yoke 74 which disengages the axle gear clutch 64 from the case clutch 66. It may be advantageous that the mechanism for unlocking the differential be located within the differential housing 76 to protect it from the elements.

In another embodiment of the invention, the front gearbox 150 includes a lockable differential. In this embodiment, the first position 38A of the switch 108 sends a signal to unlock both the front and rear lockable differentials providing a four wheel drive mode that minimizes ground disturbance and tire scrubbing through the differential action of the unlocked differentials (turf mode). In the second position 38B, switch 108 sends a signal to lock one of the differentials allowing for greater traction but with the improved handling and lower ground disturbance associated with the unlocked other differential. In the third position 38C, switch 108 sends a signal to lock both of the differentials providing maximum traction for the ATV.

This embodiment of the invention could further optionally include a coupler between the engine 106 and the front gearbox 150. This coupler is preferably actuated by the multi-position switch 108 or a second switch 112 easily accessible to the operator of the ATV to allow for the selection of rear wheel drive only. Control of this coupler in this fashion would allow simple operator selection of two additional traction modes of two wheel drive with a locked rear differential and two wheel drive with an open or unlocked differential. This alternative embodiment gives the vehicle operator five traction modes from which to choose: rear wheel drive with an unlocked differential, rear wheel drive with a locked differential, four wheel drive with two unlocked differentials, four wheel drive with one locked and one unlocked differential (preferably rear locked and front unlocked), and four wheel drive with two locked differentials.

In another embodiment of this invention, a four position switch could be used to allow the traction modes of 1) a locked differential with actuated couplers for on-demand four wheel drive, 2) a locked differential with unactuated couplers for traditional ATV two wheel drive, 3) an unlocked differential with unactuated couplers for minimum tire scrub and ground damage, and 4) an unlocked differential with actuated couplers for reduced tire scrub and ground damage with the potential for front wheel drive assistance if the traction of the open differential fails.

In yet another embodiment, the vehicle could have only two traction modes, unlocked differential with unactuated couplers for minimizing tire scrub and turf damage and a locked differential with actuated couplers for maximizing traction in adverse environments.

This multimodal vehicle traction system provides for simple selection of different traction options through the use of a convenient all-in-one switch. The ATV of the invention has the flexibility to be successful in difficult off-road environments and also be driven on delicate surfaces without damaging them.

While preferred embodiments of the present invention have been described, it should be understood that various changes, adaptations and modifications may be made therein without departing from the spirit of the invention and the scope of the appended claims.

What is claimed is:

1. A motor vehicle having a multimode traction system and particularly adapted for use both off-road and on delicate terrain, the vehicle comprising: a pair of rear wheels, a pair of steerable front wheels, an engine for generating torque to drive the wheels, a differential operatively connected within a drive train and supplying engine torque received from the engine to at least one of the wheels, a manually operable mode switch settable in first and second positions and located for easy operation by an operator of the vehicle while the vehicle is moving, the differential including a lock that locks the differential in response to setting the switch into the first of the switch positions, the differential lock unlocking the differential in response to setting the switch in the second of the switch positions, the differential lock being biased in the locked position so that the differential is locked when the vehicle is off to facilitate secure parking of the vehicle.

2. The vehicle of claim 1, wherein the differential locks if no signal is received from the switch.

3. The vehicle of claim 1, wherein the differential lock is located within a differential housing and is activated by electrical power.

4. The vehicle of claim 1, further comprising a front wheel coupler connected within the drive train and receiving engine torque, the mode switch being settable in turf mode and traction mode positions, the coupler enabling torque received from the engine to be supplied to at least one front wheel to enable front wheel drive when the switch is set in the traction mode position, and the coupler disenabling engine torque from being supplied to the front wheels when the switch is set in the turf mode position.

5. The vehicle of claim 4, wherein the differential includes a rear differential, the rear differential operatively connected within a drive train and supplying engine torque to the rear wheels, the rear differential including the lock for locking the rear differential when the mode switch is set in the traction mode position and for unlocking the rear differential when the mode switch is set in the turf mode position.

6. The vehicle of claim 5, wherein the mode switch is settable in a rear wheel drive mode position, and, when the mode switch is set in the rear wheel drive mode position, the lock locks the rear differential and the coupler disenables engine torque from being supplied to the front wheels.

7. The vehicle of claim 4, wherein the mode switch is electronic.

8. The vehicle of claim 4, wherein the mode switch is a three position switch.

9. The vehicle of claim 5, wherein the coupler is capable of being activated by setting the switch in the traction mode position, and the coupler, when activated, supplies engine torque via the drive train to at least one front wheel when the rotational speed of such at least one front wheel differs by a predetermined amount from the rotational speed of at least one rear wheel.

10. A motor vehicle having a multimode traction system and adapted for use both off-road and on delicate terrain, the vehicle comprising: a pair of rear wheels, a pair of steerable front wheels, an engine for generating torque to drive the wheels, a differential operatively connected within a drive train and supplying engine torque received from the engine to at least one of the wheels, a manually operable mode switch settable in first and second positions and located for easy operation by an operator of the vehicle while the vehicle is moving, the differential including a lock that is configured to lock the differential in response to setting the switch into the first of the switch positions, the differential lock configured to unlock the differential in response to setting the switch in the second of the switch positions, and the differential lock further configured to lock the differential when no electrical signal is supplied to the differential.

11. The vehicle of claim 10, further comprising a front wheel coupler connected within the drive train and receiving engine torque, the mode switch being settable in turf mode and traction mode positions, the coupler enabling torque received from the engine to be supplied to at least one front wheel to enable front wheel drive when the switch is set in the traction mode position, and the coupler disenabling engine torque from being supplied to the front wheels when the switch is set in the turf mode position.

12. The vehicle of claim 11, wherein the differential includes a rear differential, the rear differential operatively connected within a drive train and supplying engine torque to the rear wheels, the rear differential including the lock for locking the rear differential when the mode switch is set in the traction mode position and for unlocking the rear differential when the mode switch is set in the turf mode position.

13. The vehicle of claim 12, wherein the mode switch is settable in a rear wheel drive mode position, and, when the mode switch is set in the rear wheel drive mode position, the lock locks the rear differential and the coupler disenables engine torque from being supplied to the front wheels.

14. The vehicle of claim 11, wherein the mode switch is electronic.

15. The vehicle of claim 11, wherein the mode switch is a three position switch.

16. The vehicle of claim 12, wherein the coupler is capable of being activated by setting the switch in the traction mode position, and the coupler, when activated, supplies engine torque via the drive train to at least one front wheel when the rotational speed of such at least one front wheel differs by a predetermined amount from the rotational speed of at least one rear wheel.

* * * * *